June 6, 1933.  C. S. JENNINGS ET AL  1,912,898
VERTICAL CONVEYER
Filed March 4, 1930  3 Sheets-Sheet 1
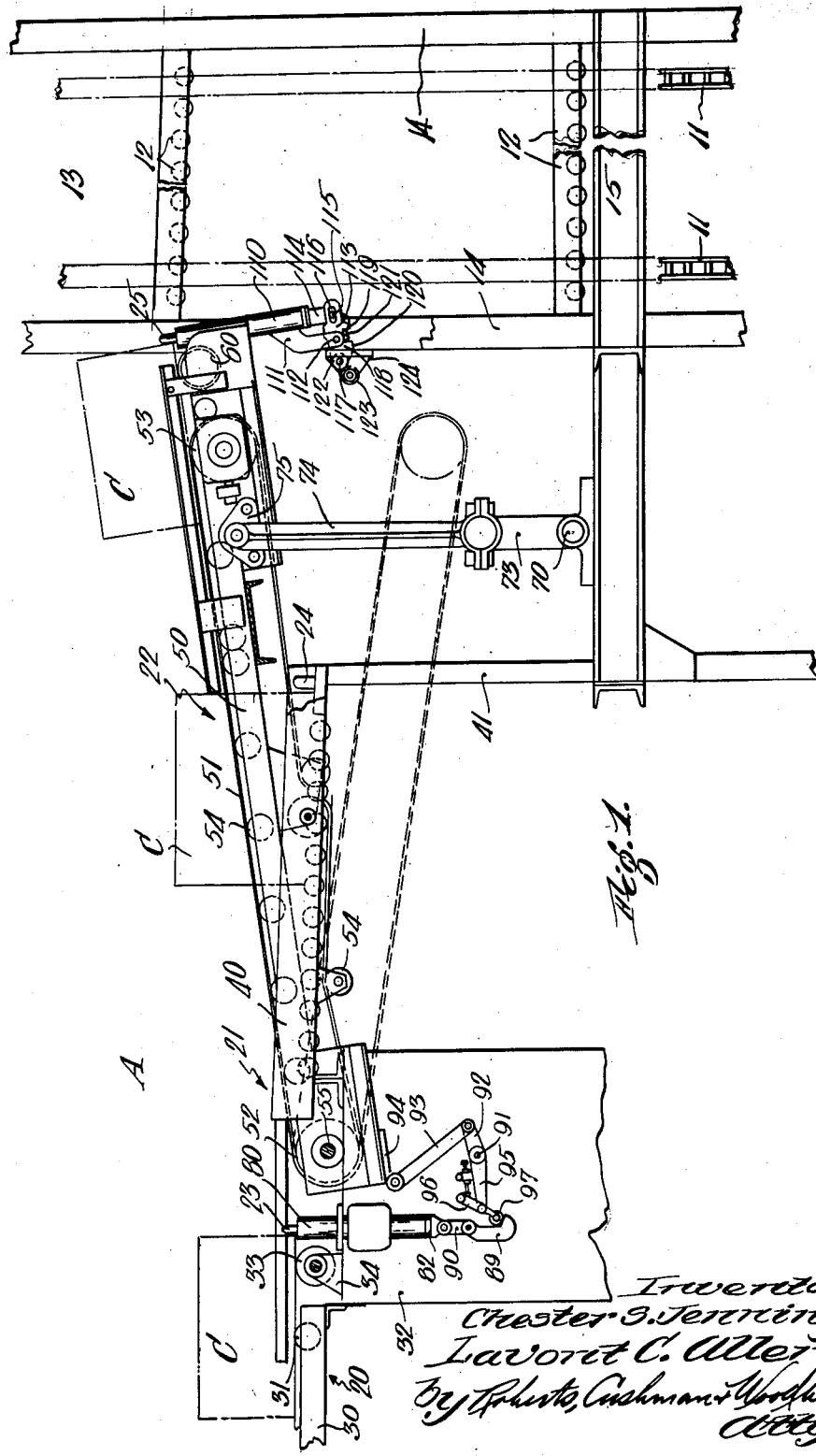

June 6, 1933. C. S. JENNINGS ET AL 1,912,898
VERTICAL CONVEYER
Filed March 4, 1930  3 Sheets-Sheet 2
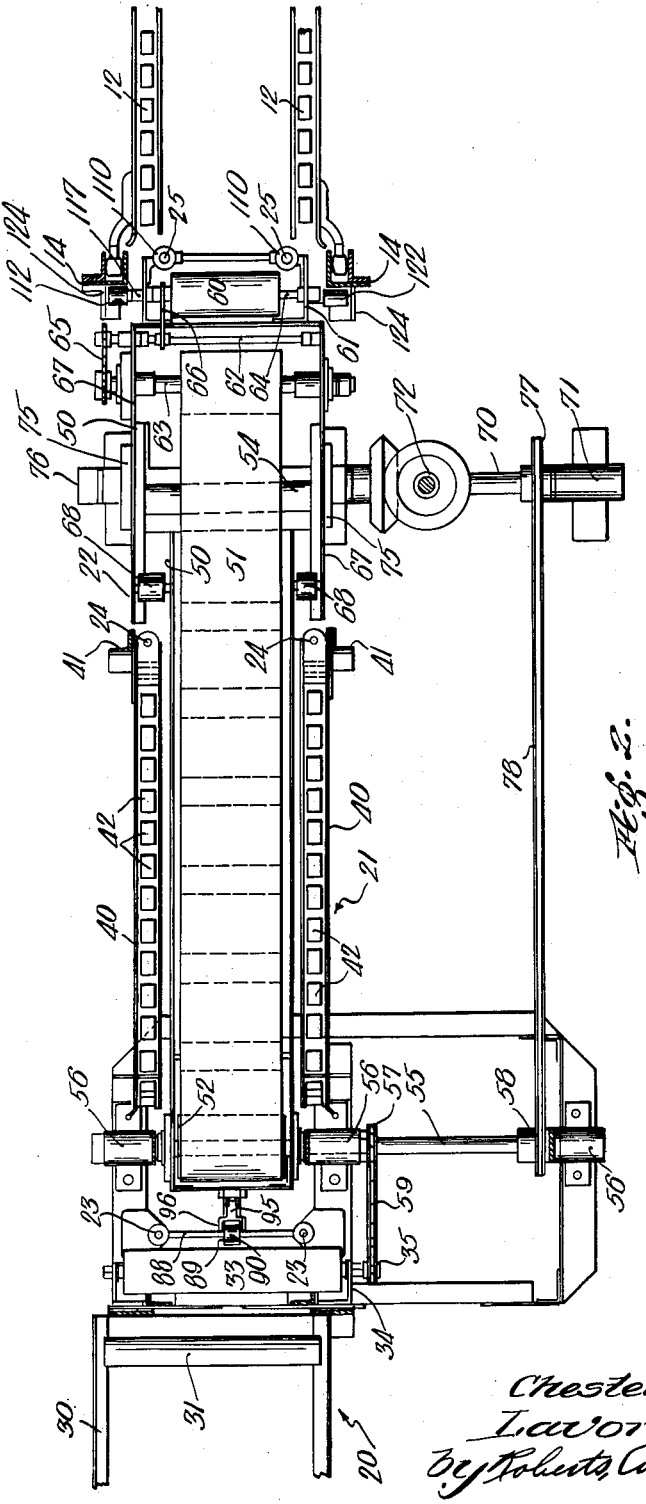

June 6, 1933.  C. S. JENNINGS ET AL  1,912,898
VERTICAL CONVEYER
Filed March 4, 1930   3 Sheets-Sheet 3
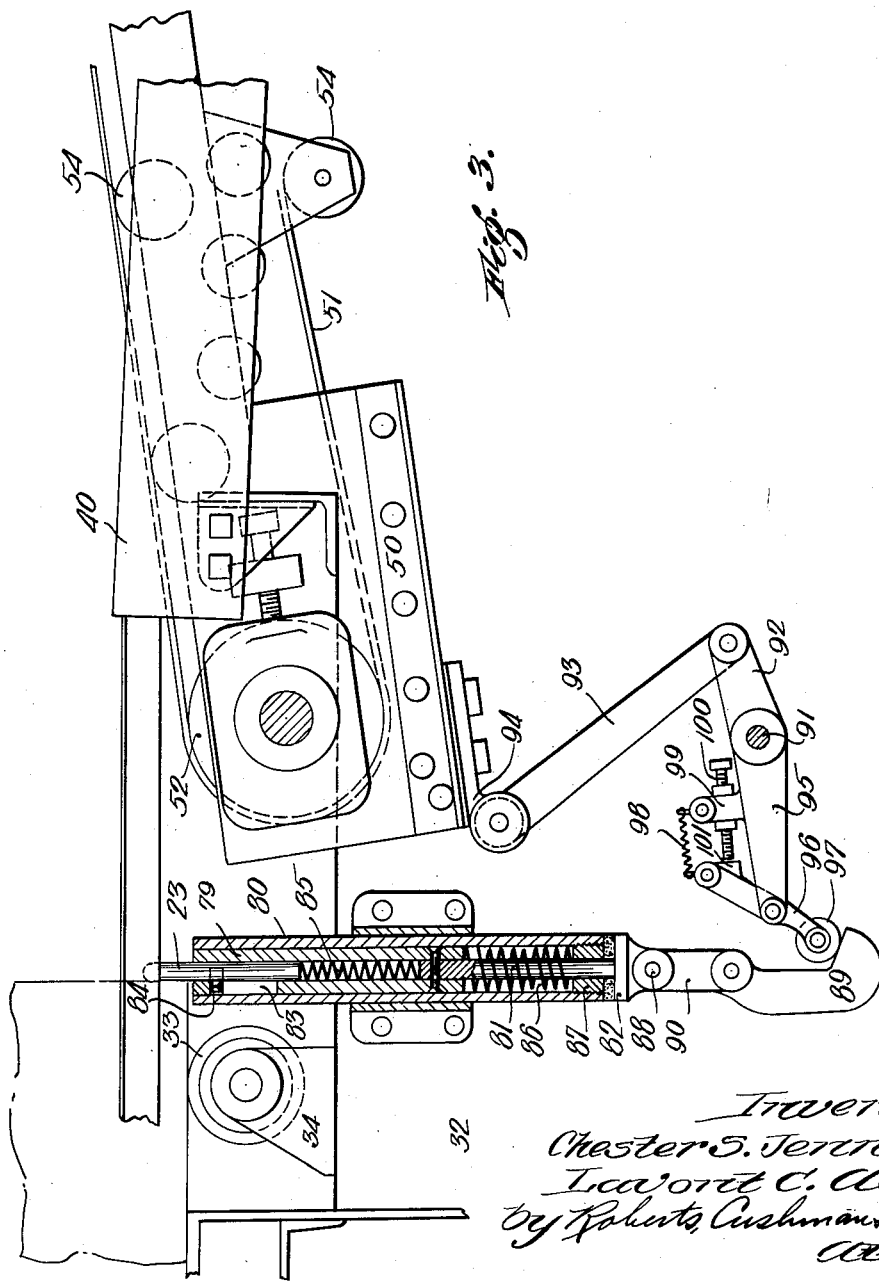

Patented June 6, 1933

1,912,898

UNITED STATES PATENT OFFICE

CHESTER S. JENNINGS AND LAVONT C. ALLEN, OF SYRACUSE, NEW YORK, ASSIGNORS TO THE LAMSON COMPANY, OF SYRACUSE, NEW YORK, A CORPORATION OF MASSACHUSETTS

VERTICAL CONVEYER

Application filed March 4, 1930. Serial No. 433,047.

This invention relates to an improvement in a vertical conveyer, more particularly in a conveyer of the general type disclosed in the application of Jennings and Libby, Serial No. 432,666 and that of Allen, Serial No. 432,636, both filed on even date herewith.

The object of this invention is to provide means for loading such conveyer, while the conveyer is continuously traveling, and for spacing the articles being loaded thereon so that only one article is loaded upon each conveyer carrier.

Another object of this invention is to provide conveyer loading mechanism wherein the load is advanced by three conveying means, being engaged by stop elements at the end of each conveying means and being automatically disengaged from the stop elements by the operation of the conveying means which operation is controlled by the conveyer so that the loads are fed to the conveyer carriers in register therewith.

Other objects of the invention will appear from a consideration of the following specification wherein one embodiment of the invention is disclosed and of the drawings which form a part of the specification and in which:

Fig. 1 is a side elevation of the loading mechanism;

Fig. 2 is a plan view thereof; and

Fig. 3 is a side elevation upon an enlarged scale of a portion of the feeding mechanism.

This invention is here described as used in connection with a vertical conveyer comprising two pairs of continually traveling chains 11 and flights 12 carried thereby and so located that when the flights are traveling downward the flights on one pair of chains coact with the corresponding flights on the other pair to form load carriers. The carriers travel in a well 13 formed by a plurality of uprights 14 and cross braces 15. The chains pass over sprockets on foot and head shafts the head shafts being connected for uniform movement and rotated by any suitable motor or prime mover (not shown) all in the usual well known manner.

Loads are supplied to the carriers at station A and removed therefrom at one or more stations. The carriers operate continuously but carry loads during their travel in one direction only. The drawings show a construction whereby this direction of travel is downward and the operation will be so described. It will be understood, however, that under certain conditions this may be reversed.

The loading mechanism at station A may be separated for convenience of description into three divisions viz: a feeding conveyer 20, a pair of separated gravity roll sections 21 and a loading belt unit 22, one end of which passes between the sections 21. At the end of the conveyer 20, are provided retractable stop pins 23, at the ends of the sections 21 are provided fixed stop pins 24 and at the end of the belt unit 22 are provided retractable stop pins 25. The journey of the load, shown here as a box C is thus divided by the stop pins into three stages corresponding to the three divisions of the loading mechanism.

The feeding conveyer 20 is preferably of the gravity roller type the inner end of the frame 30 in which rollers 31 are carried being supported by a pedestal or table 32. At the inner end of the conveyer frame 30 is mounted a roller 33 preferably rubber covered, supported upon brackets 34 and having at one end a sprocket 35 through which it is positively rotated by means described hereinbelow.

The gravity roll sections 21 each comprise a frame 40 supported at one end upon the pedestal 32 and at the other end upon an upright 41. Carried by each frame 40 is a series of freely rotatable rollers 42 and since the frames 40 are inclined downwardly any load resting thereon will be advanced by gravity into contact with the stop pins 24 which, as is clearly shown in Figs. 1 and 2, are carried by the frames 40 at the forward ends of the series of rollers 42.

The belt unit 22 comprises a frame 50 on which is supported a traveling belt 51 carried by end rollers 52, 53 and intermediate idler rolls 54. The shaft 55 of the roller 52 extends beyond the frame and is mounted in spaced journal bearings 56 carried by the pedestal 32. On the shaft 55 are fixed sprockets 57 and 58. The sprocket 57 is in substantial alignment with the sprocket 35 on the roller 33 and is connected thereto by a chain belt 59 so that the rollers 33 and 52 rotate in unison.

The frame 50 is pivotally mounted at its outer end on the shaft 55 and carries at its inner end a roller 60 supported in brackets 61. Rotatably mounted in the frame 50 at its inner end is a stub shaft 62 parallel to the shaft 63 of the roller 53 and the shaft 64 of the roller 60. These three shafts are connected in any suitable way as by sprocket and chain assemblies 65, 66 so that the roller 60 moves in unison with the roller 53.

At the inner end of the frame 50 are mounted side plates 67 and, as a support to the outer edges of the boxes C, one of the idler rolls 54 is extended beyond the edges of the belt 51 and supplementary rolls 68 are provided at each edge.

The inner end of the unit 22 is oscillated by means of a shaft 70 suitably supported in journals 71 and driven from one of the head shafts through a shaft 72. Fixed upon one end of the shaft 70 is an arm 73 connected to a yoked arm 74 pivoted at its upper ends upon brackets 75 fixed at each side of the frame 50. In alignment with the shaft 70 is a stub shaft 76 which is also connected to the yoked arm 74 by an arm not shown but corresponding to the arm 73 so that the frame 50 while oscillated, is held against tilting or twisting. The shaft 55 is driven from the shaft 70 by means of a sprocket 77 on the shaft 70 in substantial alignment with the sprocket 58 and a chain 78. It will be noted that all the positively moved elements of the loading mechanism are actuated through the shaft 70, by the conveyer operating means so that they move in register with the travel of the carriers.

The stop pins 23 at the inner end of the feeding conveyer 20 are controlled by the belt unit 22 as shown particularly in Fig. 3. Each pin 23 is reciprocably mounted in a sleeve 79 carried by a casing 80. The sleeve 79 is fixed at its lower end to a rod 81 carried by a movable plate 82 and has a longitudinal slot 83 in which travels a button 84 projecting from the pin 23. A spring 85 holds the pin 23 extended beyond the sleeve 79 into the path of travel of the box C and a spring 86 bearing against a collar 87 on the rod 81 holds the sleeve 79 raised as shown in Fig. 3. The plates 82 are connected by a rod 88 to which a dependent hook 89 is connected by a link 90. The hook 89 is the element by which the pin 23 is retracted by the belt unit 22, in opposition to the urge of the springs 85, 86.

Carried by a shaft 91 supported upon the pedestal 32 is an arm 92 connected by a link 93 to a bracket 94 attached to the outer end of the frame 50. Projecting from the shaft 91 in alignment with the hook 89 is an arm 95. Pivoted on the outer end of the arm 95 is a lever 96 at one end of which is mounted a roller 97 which normally engages the hook 89 as shown in the drawings. The other end of the lever 96 is connected by a spring 98 to a post 99 carried by the arm 95. The limit of the movement imparted to the lever 96 by the spring 98 is adjustably determined by a set screw 100 mounted in the post 99 and bearing against a block 101 on the lever.

It will be apparent that when the forward end of the belt unit 22 is depressed, the arm 92 is raised by the link 93 and the arm 95 is depressed. The hook 89 is thereupon forced downwardly against the action of the springs 86 retracting the sleeves 79 and with them the pins 23. As the downward movement of the belt unit 22 continues the position of the roller 97 on the hook 89 shifts so that they become separated allowing the pins 23 to be returned to the raised position. The hook 89 and lever 96 are both yieldable and hence the return of the belt unit to its raised position obviously does not affect the position of the pins 23.

The stop pins 25 are also retracted upon the downward movement of the belt unit 22. These pins are reciprocable in casings 110 fixed upon the frame 50 and are preferably mounted in the same manner as are the pins 23 just described. Projecting from each casing 110 is a bracket 111 by which is supported a shaft 112 connected by arms 113 to the plates 114 which correspond to the plates 82 of the pins 23. Each arm 113 is connected to its plate 114 by a pin 115 and slot 116 whereby a certain amount of lost motion is allowed. A second shaft 117 is supported upon arms 118 carried by the shaft 112. The arms 113 and 118 have projections 119 and 120 respectively between which are mounted springs 121. At the ends of the shaft 117 are mounted rollers 122 in alignment with rolls 123 mounted in holders 124 secured to uprights 14 of the vertical conveyer well. When the belt unit 22 is lowered by the arm 73 the rollers 122 engage the rolls 123 and, acting through the arms 118 and 113, retract the pins 25. The pins 25 return to their raised position as soon as the rollers 122 leave the rolls 123 and, due to the springs 121, are not affected when the belt unit is raised.

The operations at the loading platform A will now be briefly described. The box C to be loaded onto the conveyer carriers is fed by the feeding conveyer against the stop pins 23. The belt unit 22 is, as has been pointed out above, reciprocated at regular intervals by the conveyer operating mechanism. As the unit 22 descends and is passing below the tops of the rollers 42 of the sections 21, the pins 23 are retracted and the box C is advanced by the roller 33 and the belt 51 at the end roller 52 onto the gravity roller sections 21 and thence travels by gravity into contact with the stop pins 24. The unit 22 upon its upward journey lifts the box off the sections 21 and the belt 51 carries it up to the pins 25. For convenience in understanding this feeding operation, the position of the box at each of these three stages is indicated in dotted lines on Fig. 1.

The travel of the inner end of the belt unit 21 is arranged so that it starts downward in register with a carrier and is returned to its upper position in time to register with the succeeding carrier. The retraction of the pins 25, as previously described, allows the box to be advanced onto a carrier by the belt 51 and roller 60 at such speed that it is entirely onto the carrier by the time the unit has reached its lowest position as indicated in dotted lines on Fig. 1. Meanwhile as the unit 22 is descending the pins 23 are retracted and another box C is advanced onto the sections 21 against the stop pins 24.

The release of the stop pins 23 or 25 before the trucks have passed completely over them does not create any difficulty since the weight of the boxes is sufficient to hold them retracted until released by the passing of the boxes. The return of the pins 23 to the functioning position as soon as the box has passed prevents the feeding of a second box onto the sections 21 until the unit 22 has completed its travel and has again retracted the pins 23. It will thus be noted that the boxes C are automatically spaced apart so that only one box will be fed to each carrier.

The specific embodiment herein described and shown on the drawings was selected as illustrative and not limitative since it is obvious that other embodiments of the invention can be made without departing from the spirit and scope thereof as set forth in the following claims.

We claim:

1. The combination, with a continuously traveling conveyer and means for operating the same, of loading mechanism therefor, such mechanism comprising a feeding conveyer, a gravity conveyer and a belt conveyer and stop elements at the forward end of each conveyer which engage and stop the travel of loads thereover, said belt conveyer including a pivotally mounted frame and connections between said traveling conveyer operating means and said frame whereby said belt conveyer is oscillated independently of the feeding conveyer and the gravity conveyer in register with the travel of the traveling conveyer to free the loads on the loading mechanism from said stop elements.

2. The combination, with a continuously traveling conveyer and means for operating the same, of loading mechanism therefor, such mechanism comprising a feeding conveyer, a gravity conveyer and a belt conveyer and stop elements at the forward end of each conveyer which engage and stop the travel of loads thereover, certain of said stop elements being reciprocable and said belt conveyer including a pivotally mounted frame, means for oscillating said frame independently of the feeding conveyer and the gravity conveyer and means actuated thereby during the oscillation of the frame for retracting said elements to free the loads on the loading mechanism from said stop elements.

3. The combination, with a continuously traveling conveyer and means for operating the same, of loading mechanism therefor, such mechanism comprising a feeding conveyer, a gravity conveyer and a belt conveyer and stop elements at the forward end of each conveyer, certain of said stop elements being fixed and said belt conveyer including a pivotally mounted frame, and means for oscillating said frame, said frame during its oscillations shifting the loads bodily out of engagement with said fixed stop elements.

4. The combination, with a continuously traveling conveyer and means for operating the same, of loading mechanism therefor, such mechanism comprising a feeding conveyer, a gravity conveyer and a belt conveyer and stop elements at the forward end of each conveyer, certain of said stop elements being retractable and others being fixed and said belt conveyer including a pivotally mounted frame, means for oscillating said frame and means actuated thereby during the oscillation of the frame for retracting said retractable stop elements, said frame during its oscillation also shifting the loads bodily out of engagement with said fixed stop elements.

5. The combination, with a continuously traveling conveyer and means for operating the same, of loading mechanism therefor, such mechanism comprising a feeding conveyer, a gravity conveyer and a belt conveyer and stop elements at the forward end of each conveyer, certain of said stop elements being retractable and others being fixed, and said belt conveyer including a pivotally mounted frame, means for oscillating said frame and means actuated during the travel of the frame in one direction for retracting said retractable stop elements, said frame during its travel in the opposite direction shifting the loads bodily out of engagement with said fixed stop elements.

6. The combination, with a continuously traveling conveyer and means for operating the same, of loading mechanism therefor, such mechanism comprising a feeding conveyer, a gravity conveyer and a belt conveyer and stop elements at the forward end of each conveyer, said gravity conveyer consisting of two sections and said belt conveyor including a pivotally mounted frame one end of which extends between said conveyer sections and connections between the traveling conveyer operating means and said frame for oscillating the frame in register with the travel of the traveling conveyer.

7. The combination with a continuously traveling conveyer and means for operating the same, of loading mechanism therefor, such mechanism including a belt conveyer, comprising a frame pivotally mounted at its outer end and terminating at its inner end adjacent said traveling conveyer, a power driven belt supported upon said frame, means for imparting a movement of oscillation to the frame, retractable stop elements at the inner end of the frame which elements normally limit the advance of loads upon the belt, and means engageable by said stop elements upon the movement of the frame in one direction for retracting said elements and permitting the load to be advanced onto the traveling conveyer.

8. The combination with a continuously traveling conveyer and means for operating the same, of loading mechanism therefor, such mechanism including a belt conveyer, comprising a frame pivotally mounted at its outer end and terminating at its inner end adjacent said traveling conveyer, a power driven belt supported upon said frame, means for imparting a movement of oscillation to the frame, retractable stop elements at the inner end of the frame which elements normally limit the advance of loads upon the belt, a positively driven roller between said belt and said stop elements, and means engageable by said stop elements upon the movement of the frame in one direction for retracting said elements and permitting the load to be advanced onto the traveling conveyer.

9. Conveyer mechanism comprising a conveyer, a retractable stop element adjacent one end of the conveyer into contact with which stop element an article is fed by the conveyer, a positively driven roller between said conveyer and said stop element on which roller the article in contact with the elements rests, a pivotally mounted frame upon which said stop element and said roller are mounted and means for oscillating said frame and retracting said stop element when the frame approaches one limit of its movement whereupon said conveyer and roller coact to advance the article past the stop element.

10. Conveyer mechanism comprising a pivotally mounted belt conveyer, a conveyer by which articles are fed thereto, stop elements intermediate said conveyers against which rests each article fed by the feeding conveyer, means for imparting a movement of oscillation to the belt conveyer, stationary gravity conveyer sections at opposite sides of said belt conveyer and means actuated by the belt conveyer during its movement for retracting the stop elements and permitting the advance of the article past the stop elements onto the adjacent end of the belt conveyer and the gravity conveyer sections.

11. Conveyer mechanism comprising a pivotally mounted belt conveyer, a conveyer by which articles are fed thereto, stop elements intermediate said conveyers against which rests each article fed by the feeding conveyer, means for imparting a movement of oscillation to the belt conveyer, stationary gravity conveyer sections at opposite sides of said belt conveyer, which belt conveyer in its movement of oscillation rises above and descends below the gravity conveyer sections and means actuated by the belt conveyer, as it passes below the conveyer sections for retracting said stop elements and permitting the advance of the article past the stop elements onto the adjacent end of the belt conveyer and the gravity conveyer sections.

Signed by us at Syracuse, N. Y., this 19th day of February 1930.

CHESTER S. JENNINGS.
LAVONT C. ALLEN.